(12) United States Patent
Dixon, Jr.

(10) Patent No.: US 6,772,336 B1
(45) Date of Patent: Aug. 3, 2004

(54) COMPUTER ACCESS AUTHENTICATION METHOD

(76) Inventor: Alfred R. Dixon, Jr., 1200 W. 11 Mile Rd., Royal Oak, MI (US) 48067

( * ) Notice: Subject to any disclaimer, the term of this patent is extended or adjusted under 35 U.S.C. 154(b) by 0 days.

(21) Appl. No.: 09/419,367

(22) Filed: Oct. 15, 1999

Related U.S. Application Data

(60) Provisional application No. 60/104,559, filed on Oct. 16, 1998.

(51) Int. Cl.[7] .............................................. G06F 17/30
(52) U.S. Cl. ....................... 713/165; 713/166; 713/168; 713/170
(58) Field of Search ............................... 713/165, 166, 713/168, 170; 380/255, 258

(56) References Cited

U.S. PATENT DOCUMENTS

| | | | |
|---|---|---|---|
| 5,432,851 A | * | 7/1995 | Scheidt et al. ................. 380/25 |
| 5,442,342 A | | 8/1995 | Kung .................... 340/825.34 |
| 5,668,876 A | | 9/1997 | Falk et al. ..................... 380/25 |
| 6,161,185 A | * | 12/2000 | Guthrie et al. .............. 713/201 |
| 6,327,659 B2 | * | 12/2001 | Boroditsky et al. .......... 713/182 |

* cited by examiner

Primary Examiner—Albert Decady
Assistant Examiner—Todd M. Jack
(74) Attorney, Agent, or Firm—Young & Basile, P.C.

(57) ABSTRACT

A unique method of authenticating access to a computer system or central processor is disclosed. The computer system is in data communication with a plurality of stored challenges and response pairs in a set, with one challenge corresponding to only one response. After a user successfully logs onto the system, the system randomly selects one of the challenges from the set to which the user must respond. If, after comparing the user response with the response in the set corresponding to the selected challenge, the system determines a match, the system continues to select challenges and prompting for responses and will ultimately allow access to the central processor after a predetermined number of matches are received from the user.

10 Claims, 3 Drawing Sheets

| | CHALLENGE | RESPONSE |
|---|---|---|
| 1 | DOG | POUND |
| 2 | TREE | FROG |
| 3 | YEAR | LATE |
| 4 | RED | BLUE |
| 5 | TIE | TRAIN |
| 6 | HAIR | TOSS |
| 7 | BOY | NAPKIN |
| 8 | CLOUD | FOG |
| 9 | ANTENNA | SCOUT |
| 10 | CHAIR | SLEEP |

COMPUTER ACCESS AUTHENTICATION METHOD

CROSS REFERENCE TO CO-PENDING APPLICATION

This application claims the benefit of the priority date of co-pending Provisional Application Serial No. 60/104,559 filed Oct. 16, 1998 In the name of Alfred R. Dixon, the entire contents of which are incorporated herein by reference.

FIELD OF THE INVENTION

The invention relates to computer access authentication methods generally and in particular to a computer access authentication method using a randomly selected challenge and response pair set stored in memory.

BACKGROUND OF THE INVENTION

Computer security in a distributed computer system or network is essential if unauthorized intruders are to be prevented from accessing sensitive or classified information or data within the computer system.

One common authentication method is the use of a password which is selected by a particular user and stored in the computer. Each new log-on session generates a prompt for the user to enter the password. Only when the entered password matches the pre-stored password is the user granted access to the computer system.

However, studies have shown that most users select passwords that are easy to remember and are generally personal in nature or are controlled by password rules that require lengthy combinations of upper and lower case numbers or non alphanumerics. These factors enable such passwords to be easily guessed by an individual having only a small amount of personal information about a particular user.

Challenge authentication protocols are also known which provide a series of challenges and responses which must be correctly answered by a user in order to gain access to a computer system. However, the challenge and response pairs typically remain unchanged over a long period of time and are generated in the same sequence from session to session. This makes the responses easier to guess by an unauthorized user surreptitiously observing a user during a log-on event.

Thus, it would be desirable to provide a computer access authentication method which provides increased computer security while still enabling user selected passwords to be employed. It would also be desirable to provide a computer access authentication method which can be easily implemented in most computer systems and computer networks.

SUMMARY OF THE INVENTION

The access authentication method of the present invention increases computer system security by requiring a user to provide a number of responses to randomly selected challenges for each log-in session. At the same time, the challenge and response pairs, formed of simple personal word pair association which the user would be instructed to use and which specifically unique to the user. This would enable the user to more easily provide the correct response to each randomly selected challenge from his/her memory so as to eliminate the need for the user to write down the correct responses.

The present method also includes a step of preselecting a total number challenges to be issued in each log-in session. The method also includes procedural steps to enable a user to pre-select each challenge and response pair in the set.

Each optional challenge can be displayed by the computer on a display or monitor, with the individual responses entered by a key pad or other input device, such as voice recognition, and also displayed on the monitor.

In another aspect of the invention, the method includes the step of establishing a maximum time for the user to input correct responses to each of a predetermined number of randomly selected challenges. If the correct number of responses are provided by the user within the established maximum time, access is granted to the computer system.

In a further aspect, the user is permitted a predetermined number of mismatched responses. If he or she is unable to correctly input a matching response before exhausting the predetermined maximum number of permissible mismatches, access to the computer is denied.

Still another aspect of the invention permits the user to update the set of previously chosen challenges and responses by prompting the user after a predetermined number of log in sessions. For further security, a high level security authorized user must first authorize the updating of the set.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figures 1, 2:
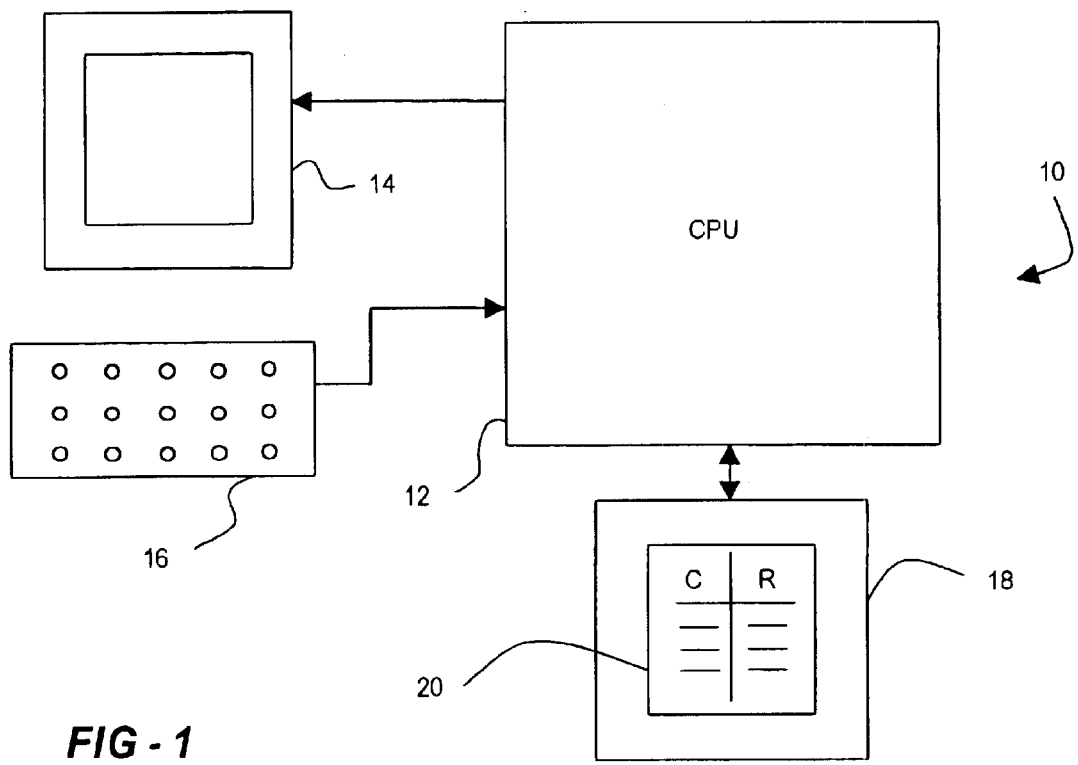
FIG. 1 is a block diagram of a central system utilizing the access authentication method of the present invention.
FIG. 2 is a pictorial representation of a stored challenge and response pair set for use in the computer system of FIG. 1.
Figure 3:
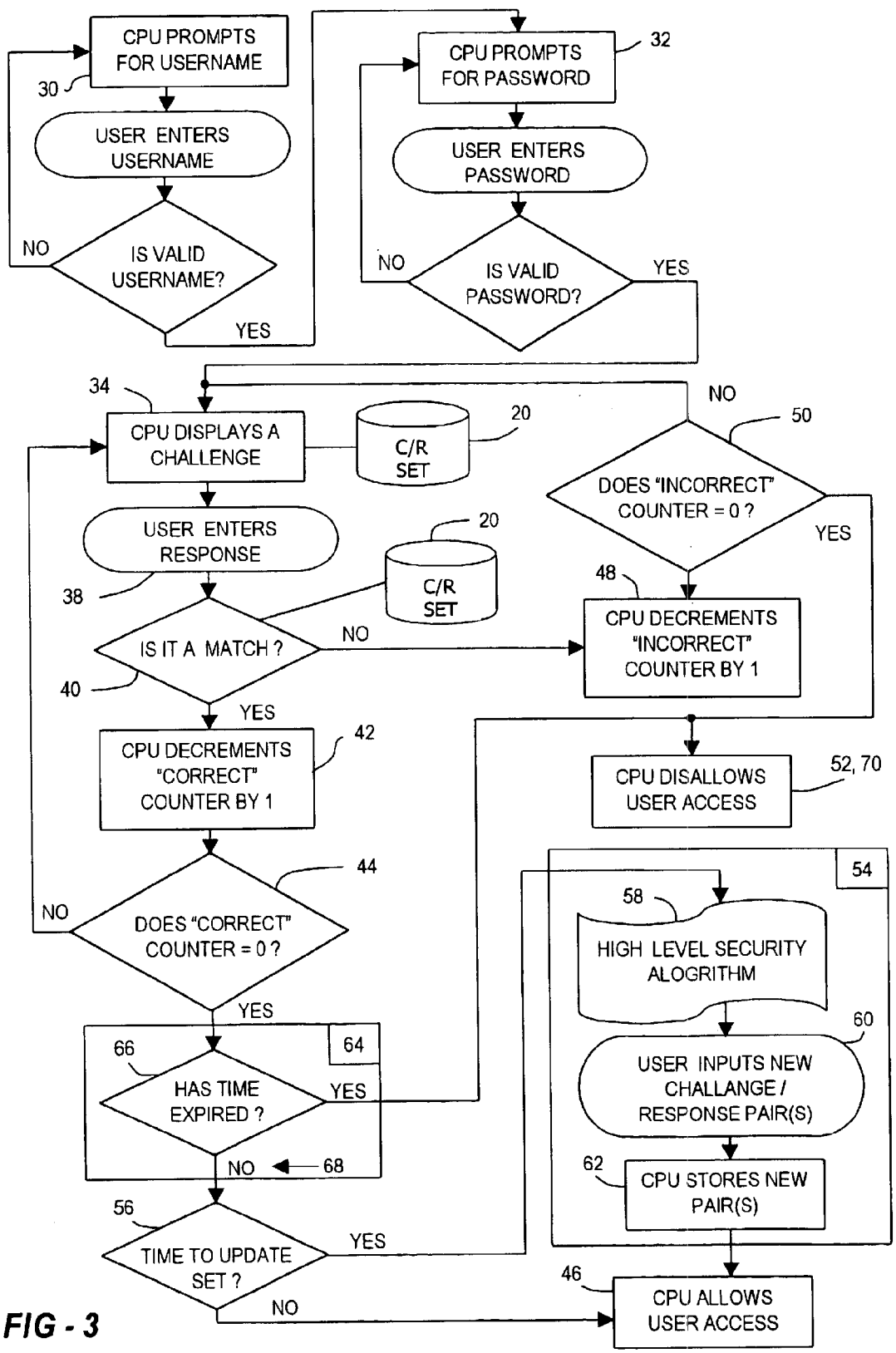
FIG. 3 is a flow diagram depicting the sequence of operation of the access authentication method of the present invention.

Referring now to the drawing, to FIGS. 1–3 in particular, there is depicted a computer system 10 which includes a central processor unit 12. It will be understood that the central processor 12 may be a network server or connected to a plurality of computers interconnected in a network including multiple central processing units. A visual display or monitor 14 is connected to the central processor 12 along with a keyboard 16 or other input device. A memory 18 is disposed in data communication with the central processor 12. The control application programs executed by the central processor 12 are stored in the memory 18 which may be either random access memory (RAM), read only memory (ROM), combinations or both, or a local or remote disk drive.

The access authentication method of the present invention employs a control program resident in the memory 18 which is operative to request the user's name by typically generating a "log-on" command followed, after recognition of a correct or authorized user's name, by a password previously selected by the user. Only after a correct user's name and a password associated with the correct user are input does the access authentication method come into play.

As shown in FIG. 2, a plurality of pairs 22 of challenges and responses are stored in the memory 18 or on the network disk drive, etc. Appropriate data is entered for each challenge and response pair 22 through a setup program which allows the user to input a particular challenge and an associated response for each pair 22. This gives the user the ability to personalize the entire set 20 of challenge and response pairs 22 so as to enable the user to easily and quickly provide the correct responses to each generated challenge.

The set 20 of pairs 22 of challenges and responses is depicted in FIG. 2 as including 10 pairs 22. This will be understood as being by way of example only as the set 20 of challenge and response pairs 22 can include any number of pairs 22.

Further, it will be understood that the user or computer system manager may establish any number of pairs 22 to be selected to authenticate access to the computer system 10. Thus, 2, 3, or more challenge and response pairs 22 may be employed in each single log-on session to provide the desired level of access security for the computer system 10. Further, even during a log-in session, when more sensitive or confidential information is to be accessed, the user can be required to provide additional responses from the set of challenge and response pairs 22.

In setting up the set 20 of challenge and response pairs 22, the user, in response to a numerical prompt 1, 2, 3, etc. will first enter a challenge which can be an actual word, a series of numbers, or an alphanumeric series of letters and numbers. A subsequent prompt enables the user to input the response which is to be associated with the current input challenge. The sequence is repeated through the remainder of the challenge and response pairs 22 which form the set 20 of challenge and response pairs 22. This entire set 20 is stored in the memory 18.

FIG. 3 depicts a flow diagram of the sequence of use of the access authentication method of the present invention.

Figure 4:
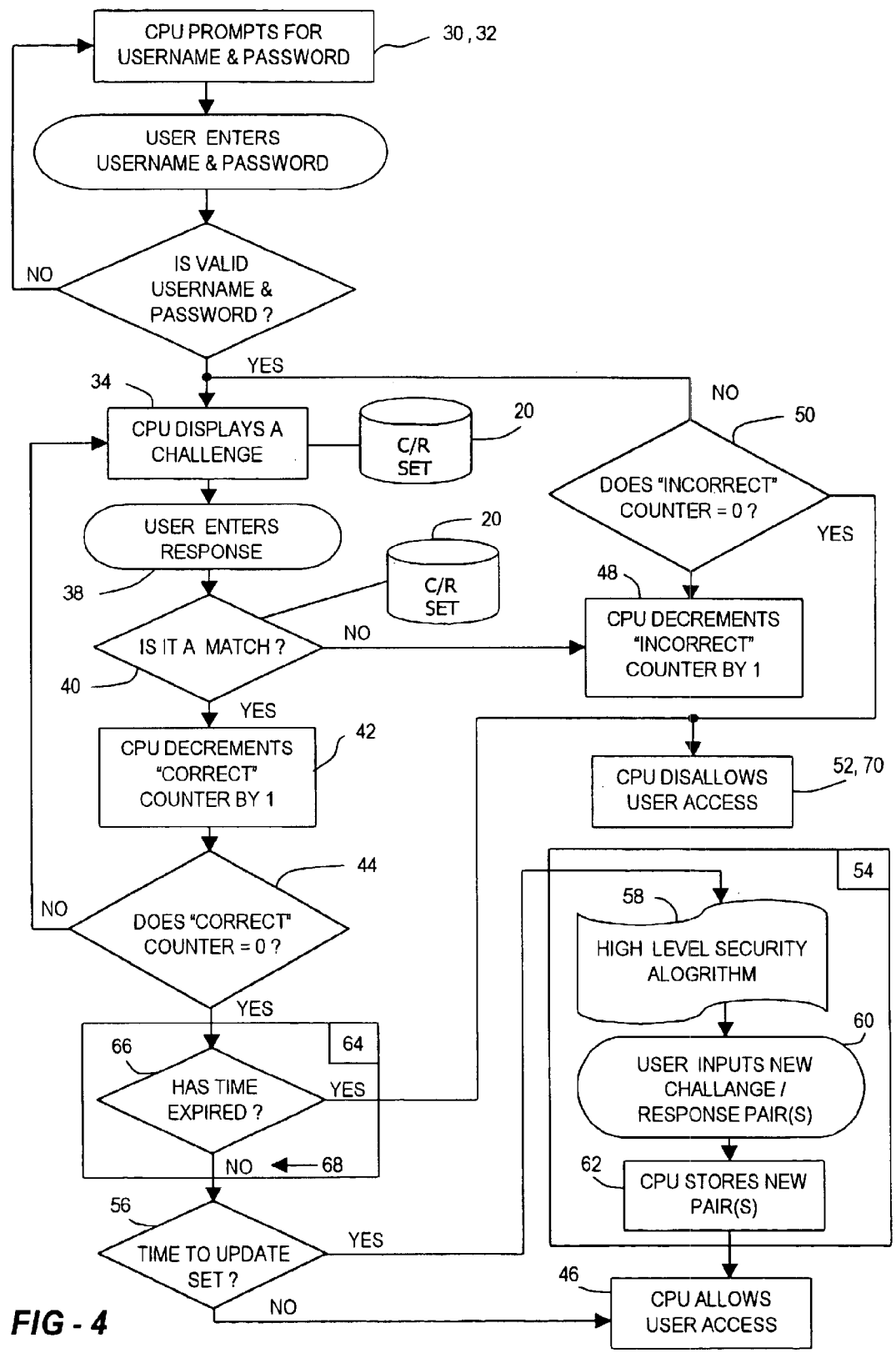
FIG. 4 is a flow diagram similar to FIG. 3 but showing an alternative log-on sequence.

FIG. 4 depicts a similar sequence of that depicted in FIG. 3 and shows an alternative log-on sequence 30 where the CPU prompts for both a user name and password. In response to a log-on command generated by the CPU 12 in step 30, the user inputs his or her name. Next, the CPU 12 generates a password query prompting the user to input a password associated with his or her name. After an authorized name and a correct password are recognized, the CPU 12 then randomly selects in step 34 one of the challenges of the challenge-response pairs 22 in the set 20 and displays the selected challenge, such as challenge number 4, which in the example above is the word "red", on the display 14. The user then inputs a response via the keyboard or other input device 16 in step 38. In the present example, the correct response to the challenge word "red" is "blue" as shown in FIG. 2. If a response match is recognized in step 40, the CPU 12 in step 42 subtracts one from the total number of challenge-response pairs to be used in each log-on session. If this total number has not been reached, the CPU 12 will return to step 34. At step 34, the CPU 12 randomly selects another challenge from the set 20 and displays the selected challenge, such as the ninth challenge term "antenna", on the display 14. The user is then required to input the correct response which, in the present example is the term "scout." It is expected that the response or word association will be easily remembered by the user, the user would perhaps be instructed to use word pairs unique to their life experience.

If the total number of correct challenge response pairs 22 was selected by the computer manager to be two, after the correct response to the second challenge the user is granted access to the computer system 10 in step 46. Of course, three, four or more challenge and responses may be used with each challenge randomly selected from the set 20. This makes it more difficult for an observer to remember all of the correct responses, especially since the challenges will differ in term and order from log-on session to log-on session.

If at any time an incorrect response is input to a particular challenge, the CPU 12 decrements a "wrong" counter in step 48. If the total number of allowable wrong answers has not been exceeded as determined in step 50, control returns to step 34. However, if an incorrect response is given to the challenge, and the "wrong" counter value has been preset to only allow one wrong answer then a new challenge is randomly selected from a plurality of challenge-response pairs 22. If a correct response is given to the new challenge, control branches to step 34 for the generation of another challenge as described above. However, if an incorrect response is given to the second selected challenge, and the "wrong" counter value has been preset to only allow two wrong answers, the counter in step 50 will equal 0 and the CPU 12 will deny access to the user in step 52, typically for a preset time such as 15 minutes, 30 minutes, 1 hour, etc., and optimally record the event as a security incident.

The individual pairs 22 of challenges and responses may be updated in step 56 after a predetermined number of log-on sessions, a predetermined number of days, or any other parameter selected by the computer system manager 58. This optional feature is indicated generally in FIG. 3 by 54. When such a parameter is reached or has expired in step 56, the CPU 12, after an authorized user has been granted access to the computer system 10 by an individual having a high security level 58, will generate a challenge and response prompt requesting the user to input a new challenge term and an associated response term in step 60. This new challenge and response pair 22 is added to the set 20 of challenge and responses pairs in step 62 and randomly replaces one of the preexisting challenge and responses pairs 22 which is then deleted from the set 20. In this manner, the challenge and response pairs 22 in the set 20 are continually updated to enhance security of the computer system 10.

Also shown in FIG. 3 as an alternative loop 64 is a time feature which may be added to the access authentication method of the present invention. A preset time period, selected by the computer system manager, such as 10 seconds, for example, will be established for each log-in session. Since an authorized user will be more quickly able to provide the correct response to each of a plurality of randomly selected challenges, an authorized user should be able to correctly answer all of the selected challenges within the pre-established time to gain access 68 to the computer system 10. The system 10 inquires at 66 if the preset time has expired and if the preset time expires before a user can input the correct responses to all of the randomly selected challenges, access can be denied 70 by the CPU 12.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of authenticating access to a computer comprising the steps of:
   a. storing a plurality of challenges and response pairs in a set, with one challenge corresponding to only one response;
   b. randomly selecting one of the challenges from the set;
   c. receiving a user response;
   d. comparing the user response with the response in the set corresponding to the selected challenge to determine a match or a mismatch;
   e. if a match is determined, randomly selecting another challenge from a set of challenges and repeating steps c & d and;
   f. allowing access to the computer after a predetermined number of matches.

2. The method of claim 1 wherein;
   step a further includes the step of storing a predetermined number of permissible mismatches;
   step d further includes the step of skipping steps e and f where a mismatch has been determined; and
   g. counting each mismatch;
   h. repeating steps b–d until the total number of mismatch counts exceeds the preset number of permissible mismatches; and then,
   i. denying access to the computer.

3. The method of claim 2, wherein access is denied to the user for a predetermined time.

4. The method of claim 1, further including in step e, the steps of repeating steps c and d for a predetermined number of log-on sessions, then, after reaching the predetermined number of log-on sessions, updating the set of challenge and responses.

5. The method of claim 4, wherein the step of updating the new set includes the steps of generating a new challenge and response prompt requesting the user to input a new challenge and matching response, adding the new challenge and a matching response to the set by randomly replacing one of the plurality of stored challenge and response pairs in the set.

6. The method of claim 5, wherein the updating step must first be authorized by a high level security user of the computer.

7. The method of claim 1, further including the step of timing steps b–f to determine whether the user has input a match to each randomly selected challenge within a predetermined time before granting access to said computer.

8. The method of claim 1, wherein the randomly selected challenges are displayed by the computer on a visual display.

9. The method of claim 1, wherein the user responses are received by the computer via a keyboard.

10. The method of claim 1, wherein the user responses are received by the computer by voice recognition.

* * * * *